United States Patent [19]
Furukawa et al.

[11] Patent Number: 5,680,772
[45] Date of Patent: Oct. 28, 1997

[54] ABSORPTION TYPE REFRIGERATING MACHINE

[75] Inventors: Masahiro Furukawa, Ohra-gun; Toshiyuki Kaneko, Ohta; Hitoshi Kanuma, Ohra-gun, all of Japan

[73] Assignee: Sanyo Electric Co., Ltd., Osaka-Fu, Japan

[21] Appl. No.: 757,298

[22] Filed: Nov. 27, 1996

[30] Foreign Application Priority Data

Nov. 29, 1995 [JP] Japan ................... 7-311402

[51] Int. Cl.$^6$ ............... F25B 15/00; F28F 1/42
[52] U.S. Cl. ............... 62/476; 62/494; 62/485; 165/179
[58] Field of Search ............... 62/494, 485, 483, 62/476; 165/109.1, 179, 133, DIG. 352, DIG. 504, DIG. 511, DIG. 525, DIG. 527, DIG. 529

[56] References Cited

U.S. PATENT DOCUMENTS

| | | | |
|---|---|---|---|
| 3,779,312 | 12/1973 | Withers et al. | 165/179 |
| 3,826,304 | 7/1974 | Withers et al. | 165/1 |
| 5,044,429 | 9/1991 | Sakaya et al. | 165/104.26 |
| 5,590,711 | 1/1997 | Ishida et al. | 165/179 |

FOREIGN PATENT DOCUMENTS 53-40776 10/1978 Japan.

Primary Examiner—William Doerrler
Attorney, Agent, or Firm—Weingarten, Schurgin, Gagnebin & Hayes LLP

[57] ABSTRACT

An absorption type refrigerating machine comprising an evaporator, an absorber, a regenerator, and a condenser, all connected by piping to form a refrigerating cycle. The evaporator, condenser or absorber includes a plurality of heat transmission pipes accommodated therein and arranged generally in a horizontal direction. Each pipe has at least one continuity of protrusion on the inner surface thereof extending in an axial direction of the pipe in a spiral fashion and at least one continuity of groove corresponding to the continuity of protrusion formed on the outer surface of the pipe.

8 Claims, 7 Drawing Sheets

ΔK: performance ratio of heat transmission coefficient of the corrugated tube to that of a bare tube ΔP: ratio of pressure loss of the corrugated tube to a bare tube

ABSORPTION TYPE REFRIGERATING MACHINE

BACKGROUND OF THE INVENTION

1. Field of the Invention

The present invention relates to an absorption type refrigerating machine comprising an evaporator, an absorber, a regenerator and a condenser which are connected by piping to form a refrigerating cycle.

2. Background Art

Heat transmission pipes provided in an evaporator of an absorption refrigerating machine are disclosed in, for example, Japanese Utility Model Publication No. 40776 of 1978 wherein a cooling water running in each heat transmission pipe is cooled by a refrigerant dispensed over the outer surface of the heat transmission pipe using a refrigerant dispenser.

In the prior art as described above, since the outer and inner surfaces of the heat transmission pipe are smooth, the cooling water running in the pipe can flow smoothly through the pipe without being sufficiently agitated. As a result, the heat transfer coefficient between the cooling water and the heat transmission pipe is low, disadvantageously requiring an increase of the number of the heat transmission pipes and, hence, the volume of the evaporator in order to secure a certain amount of transferred heat. In addition, when heat transmission pipes having smooth inner and outer surfaces are used for a condenser or absorber, similarly to the case of the evaporator, a water running in each heat transmission pipe can not be sufficiently agitated, with the heat transfer coefficient being low between the cooling water and the heat transmission pipe. In order to secure a certain amount of transferred heat, that is, a cooling capacity at the condenser or absorber, therefore, the number of the heat transmission pipes must be increased, disadvantageously increasing the volume of the condenser or absorber and, similarly to the above described problem with the evaporator, enlarging the absorption type refrigerating machine.

In order to solve the problem as above described, spiral pipes each having a protrusion formed on the inner wall of the pipe are used for an evaporator. Among such pipes, those in which the pitch of the protrusion is small and about 0.4 to 0.5 times of the outer diameter of the heat transmission pipe are widely used, so that a turbulent effect may be produced by the protrusion to improve the heat transfer coefficient in the pipe to increase the amount of exchanged heat. Since the pitch is small, however, when a refrigerant is dispensed from above onto a group of heat transmission pipes of the evaporator or the like in which the heat transmission pipes are provided in a plurality of vertical stages, the refrigerant tends to gather at the lower part of the heat exchanger due to a groove on the outer wall of each pipe corresponding to the protrusion, creating a problem that a dry heat transfer surface will be exposed to decrease the heat transfer performance and, hence, the refrigerating capacity. Moreover, if the depth of the spiral groove is greater, the refrigerant will penetrate into the grooved area instead of spreading over the outer surface of the heat transmission pipe, further impairing the wetting over the heat transfer surface. If the pitch of a protrusion is small also in an absorber, an absorbent will gather on the outer surface of each heat transmission pipe to expose a dry heat transfer surface, impairing the absorbing capacity of a refrigerant vapor.

SUMMARY OF THE INVENTION

It is the object of the present invention to improve the refrigerating capacity of an evaporator and the refrigerant absorbing capacity of an absorber to provide an enhanced and downsized absorption type refrigerating machine.

In order to achieve the object, according to a first aspect of the present invention, an absorption type refrigerating machine is provided comprising an evaporator which cools a cooling water by vaporization of a refrigerant to supply the cooling water to a load; an absorber into which a refrigerant vapor from the evaporator flows and in which a concentrated absorbent is dispensed to absorb the refrigerant vapor by the concentrated absorbent; a regenerator which heats a diluted absorbent from the absorber to separate a refrigerant vapor therefrom; and a condenser into which the refrigerant vapor from the regenerator flows and in which the refrigerant vapor is condensed, the elements all connected by piping to form a refrigerating cycle, the evaporator including a plurality of heat transmission pipes accommodated therein and arranged generally in a horizontal direction, each pipe having at least one continuity of protrusion on the inner surface thereof extending in the axial direction of the pipe in a spiral fashion and at least one continuity of groove corresponding to the continuity of protrusion formed on the outer surface of the pipe, the ratio of the pitch of the groove of each heat transmission pipe to the outer diameter dimension of the pipe being set within the range of 0.5 to 1.25; and a dispenser provided above the heat transmission pipes for dispensing the refrigerant, the ratio of the pitch of the groove of the heat transmission pipe to the refrigerant dispensation pitch of the dispenser being set within the range of 0.6 to 1.4.

According to a second aspect of the present invention, the groove of each heat transmission pipe is 0.5 mm to 5 mm in width, 0.3 mm to 0.7 mm in depth and 0.5 mm to 1 mm in radius of curvature.

According to a third aspect of the present invention, the protrusion on the inner surface of each heat transmission pipe is 0.3 mm to 0.6 mm in height.

According to a fourth aspect of the present invention, the outer surface of each heat transmission pipe is buffed and finished.

According to a fifth aspect of the present invention, an absorption type refrigerating machine is provided comprising an evaporator which cools a cooling water by vaporization of a refrigerant to supply the cooling water to a load; an absorber into which a refrigerant vapor from the evaporator flows and in which a concentrated absorbent is dispensed to absorb the refrigerant vapor by the concentrated absorbent; a regenerator which heats a diluted absorbent from the absorber to separate a refrigerant vapor therefrom; and a condenser into which the refrigerant vapor from the regenerator flows and in which the refrigerant vapor is condensed, the elements all connected by piping to form a refrigerating cycle, the condenser including a plurality of heat transmission pipes accommodated therein and arranged generally in a horizontal direction in which the cooling water flows, each pipe having at least one continuity of protrusion on the inner surface thereof extending in the axial direction of the pipe in a spiral fashion and at least one continuity of groove corresponding to the continuity of protrusion formed on the outer surface of the pipe, the groove of the heat transmission pipe being 0.5 mm to 5 mm in width, 0.3 mm to 0.7 mm in depth and 0.5 mm to 1 mm in radius of curvature and the ratio of the pitch of the groove of the heat transmission pipe to the outer diameter dimension of the pipe being set within the range of 0.5 to 1.25.

According to a sixth aspect of the present invention, an absorption type refrigerating machine is provided comprising an evaporator which cools a cooling water by vaporization of a refrigerant to supply the cooling water to a load; an absorber into which a refrigerant vapor from the evaporator flows and in which a concentrated absorbent is dispensed to absorb the refrigerant vapor by the concentrated absorbent; a regenerator which heats a diluted absorbent from the absorber to separate a refrigerant vapor therefrom; and a condenser into which the refrigerant vapor from the regenerator flows and in which the refrigerant vapor is condensed, the elements all connected by piping to form a refrigerating cycle, the absorber including a plurality of heat transmission pipes accommodated therein and arranged generally in a horizontal direction in which the cooling water flows, each pipe having at least one continuity of protrusion on the inner surface thereof extending in the axial direction of the pipe in a spiral fashion and at least one continuity of groove corresponding to the continuity of protrusion formed on the outer surface of the pipe; and a dispenser provided above the heat transmission pipes for dispensing the concentrated absorbent, the groove of the heat transmission pipe being 0.5 mm to 5 mm in width, 0.3 mm to 0.7 mm in depth and 0.5 mm to 1 mm in radius of curvature, the ratio of the pitch of the groove of the heat transmission pipe to the outer diameter dimension of the pipe being set within the range of 0.5 to 1.25, and the ratio of the pitch of the groove of the heat transmission pipe to the absorbent dispensation pitch of the dispenser being set within the range of 0.6 to 1.4.

According to the first aspect of the present invention, part of the refrigerant dripped onto each heat transmission pipe of the evaporator will flow along the spiral groove, and the remainder of the refrigerant will spread over the whole outer surface of the heat transmission pipe. The flow of cooling water running in the pipe will be turbulent by the protrusion. By providing the pitch of the groove at a predetermined ratio to the outer dimension of the pipe and to the refrigerant dispensation pitch, the refrigerant can spread moderately over the surface of the heat transmission pipe. Because of the appropriately provided pitch of the groove, a sufficient turbulent effect in the heat transmission pipe will be obtained by the protrusion corresponding to the groove.

According to the second aspect of the present invention, by providing the groove of a shape having the predetermined dimensions, the refrigerant will flow along the groove and will be prevented from penetrating into the groove, hardly spreading over.

According to the third aspect of the present invention, by providing the height of the protrusion on the inner surface of each heat transmission pipe at a predetermined dimension, a sufficient turbulent effect can be obtained and a flow loss of the heat transmission pipe can be kept at a relatively low level.

According to the fourth aspect of the present invention, wettability of the outer surface of each heat transmission pipe against the refrigerant can further be improved.

According to the fifth aspect of the present invention, the refrigerant condensed on the outer surface of each heat transmission pipe in the condenser will flow intensively along the groove on the outer surface of the pipe and will be prevented from spreading over the whole outer surface of the pipe. A turbulent flow will also be generated in the cooling water by the protrusion formed on the inner surface of the heat transmission pipe, improving the heat transfer efficiency between the cooling water and the heat transmission pipe. By providing the pitch of the groove at a predetermined ratio to the outer dimension of the pipe, the refrigerant will spread moderately over the surface of the heat transmission pipe.

According to the sixth aspect of the present invention, the absorbent dripped onto each heat transmission pipe of the absorber will spread generally over the whole outer surface of the pipe. A turbulent flow will be generated by the protrusion in the cooling water running in the pipe. By providing the pitch of the groove at a predetermined ratio to the outer dimension of the pipe and to the absorbent dispensation pitch, the absorbent will spread moderately over the surface of the heat transmission pipe and, because of the appropriately provided pitch of the groove, a sufficient turbulent effect in the heat transmission pipe will be obtained by the protrusion corresponding to the groove.

DETAILED DESCRIPTION OF THE PREFERRED EMBODIMENTS

Figure 1:
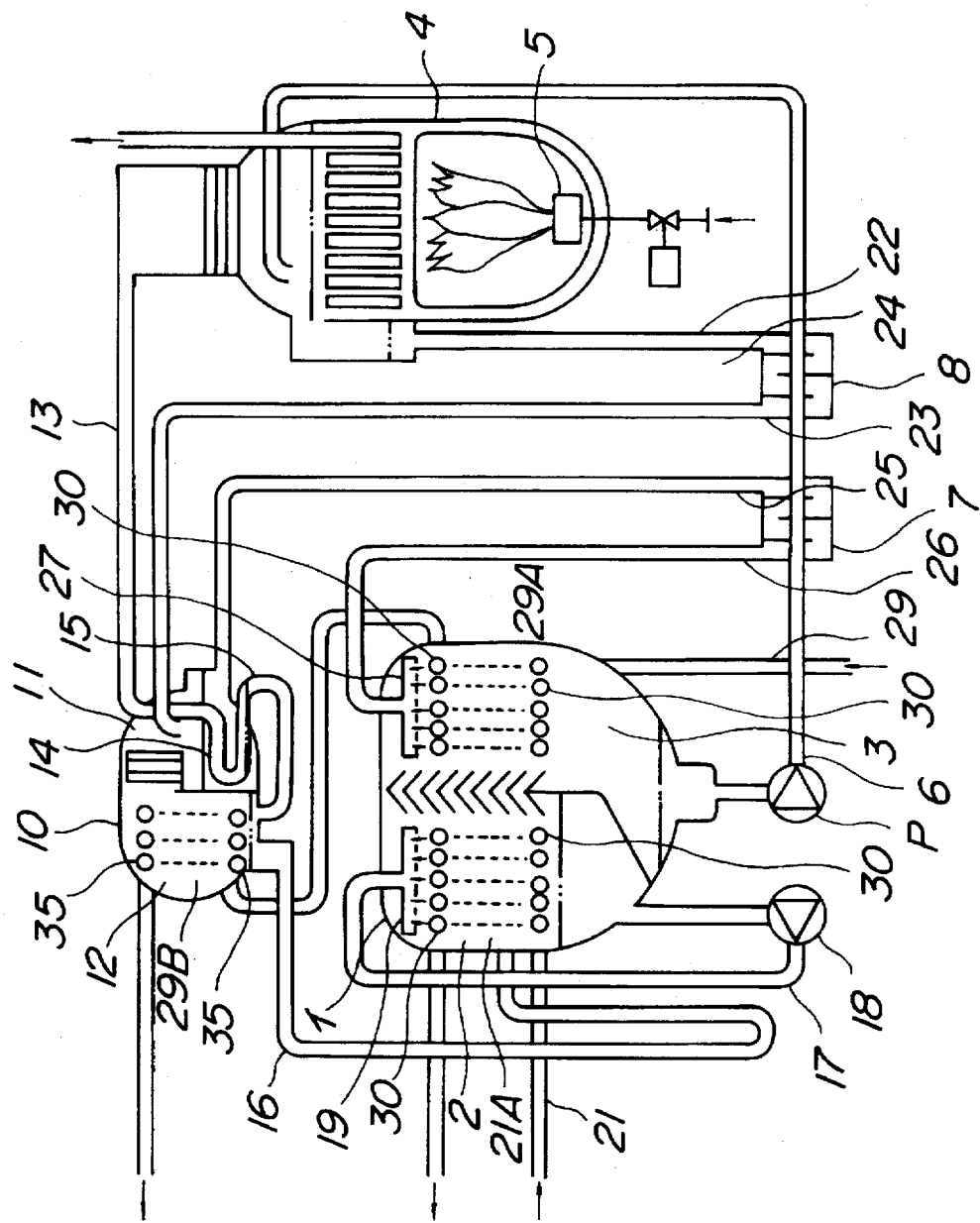
FIG. 1 is a circuit diagram of an absorption type refrigerating machine.

The preferred embodiments of the present invention will now be described with reference to the drawings. In FIG. 1, a low temperature evaporator-absorber shell (lower shell) 1 accommodates an evaporator 2 and an absorber 3. A high temperature regenerator 4 includes a gas burner 5 for example. Provided along a diluted absorbent pipe 6 from the absorber 3 to the high temperature regenerator 4 are a first absorbent pump P, a low temperature heat exchanger 7 and a high temperature heat exchanger 8.

A high temperature condenser-regenerator shell (upper shell) 10 accommodates a low temperature regenerator 11 and a condenser 12. Refrigerant vapor pipe 13 extends from the high temperature regenerator 4 to the low temperature regenerator 11. A heater 14 is provided in the low temperature regenerator 11. A refrigerant pipe 15 extends from the heater 14 to the condenser 12. A refrigerant liquid flow pipe 16 extends from the condenser 12 down to the evaporator 2, and a refrigerant circulation pipe 17 is connected by piping to the evaporator 2. Also provided are a refrigerant pump 18 and a refrigerant dispenser 19. A cooling water pipe 21 is connected to the evaporator 2. An evaporator heat exchanger 21A is also provided.

An intermediate absorption pipe 22 extends from the high temperature regenerator 4 to the high temperature heat exchanger 8, and an intermediate absorbent pipe 23 which has an inflow port 23A extends from the high temperature heat exchanger 8 to the low temperature regenerator 11. A second absorbent pump 24 is provided along the intermediate absorbent pipe 23. A concentrated absorbent pipe 25 extends from the low temperature regenerator 11 to the low temperature heat exchanger 7, and another concentrated absorbent pipe 26 extends from the low temperature heat exchanger 7 to the absorber 3. Also provided are a concentrated absorbent dispenser 27, a cooling water pipe 29, an absorber heat exchanger 29A and a condenser heat exchanger 29B.

Figure 2:
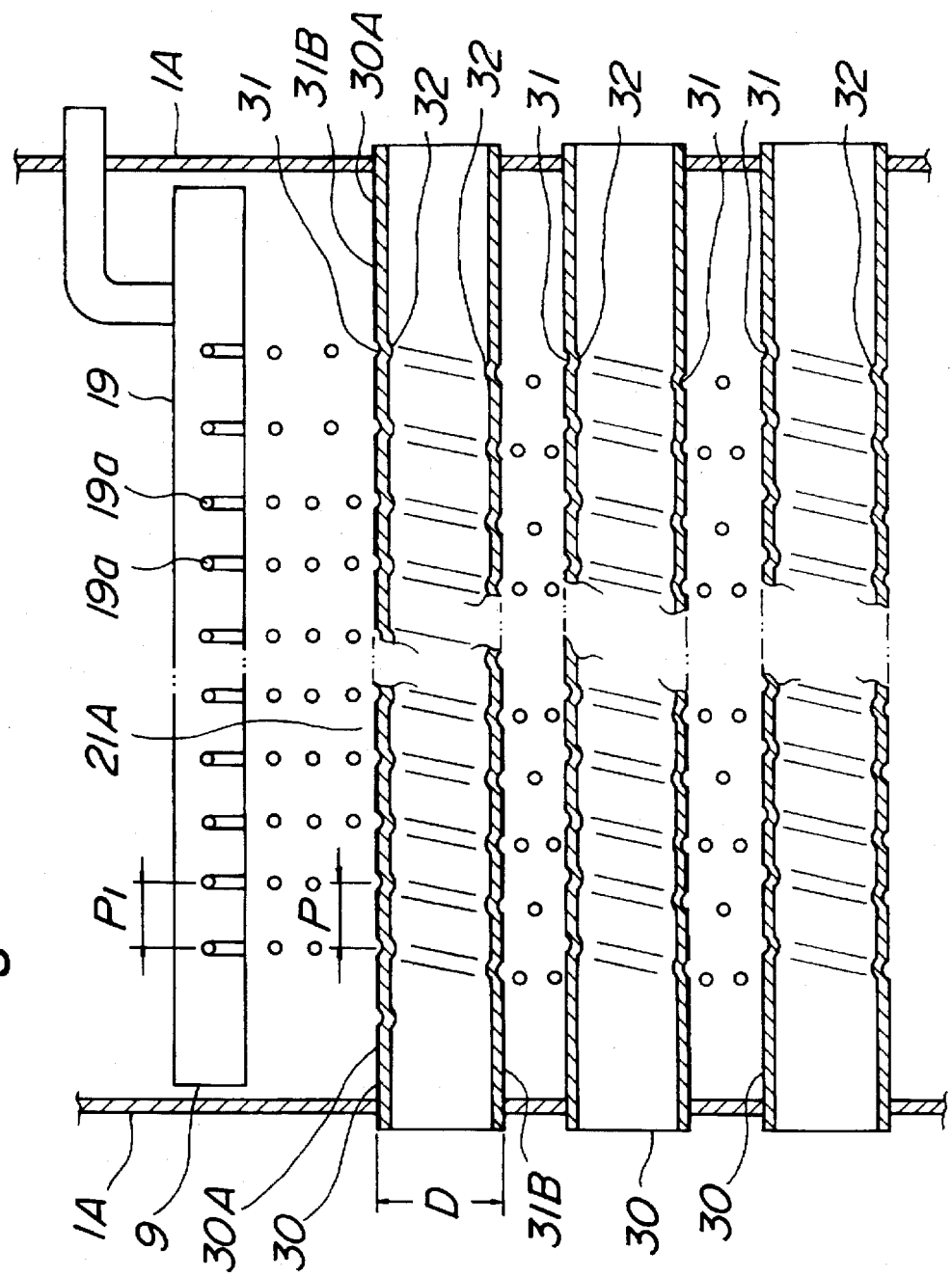
FIG. 2 is a side view illustrating the structure of an evaporator.

As illustrated in FIG. 2, the evaporator heat exchanger 21A is composed of evaporator heat transmission pipes 30 which are connected by piping in a plurality of columns and rows. These heat transmission pipes 30 are degreased on the both, outer and inner, surfaces by, for example, an alcohol and are polished and finished on the outer surfaces by, for example, a buff. Supporter portions 30A, 30A are formed at the both ends of each heat transmission pipe 30. The supporter portions 30A, 30A have smooth outer and inner surfaces and are retained by pipe plates 1A, 1A provided at the both ends of the evaporator-absorber shell 1. Each heat transmission pipe 30 is circular in section and has a diameter of, for example, 16 mm over the whole length. Above the heat transmission pipes 30, a dispenser (tray) 19 is provided which has a plurality of drip holes 19a for dispensing refrigerant. Each of the above heat transmission pipes 30 is a corrugated pipe having a spiral shape, and has at least one continuity of groove 31 formed on the outer surface and extending in a spiral fashion. Corresponding to the continuity of groove 31, a continuity of protrusion 32 is formed on the inner surface of the heat transmission pipe.

The continuities of groove 31 and protrusion 32 each have a partially spiraled portions 31B, 31B formed at the both ends where the depth of the groove 31 and the height of the protrusion 32 gradually decrease toward the supporter portions 30A, 30A. The partially spiraled portions 31B, 31B are formed, for example, of a length less than a half of the outer periphery of the heat transmission pipe 30. The terms "continuity of groove 31" and "continuity of protrusion 32" will hereinafter referred to simply as "groove 31" and "protrusion 32," respectively.

If the pitch P of the groove 31 is too small, the amount of the refrigerant dripped which penetrates into the groove 31 will increase, thereby eliminating the lateral spread of the refrigerant, while if it is too large, a turbulent effect produced by the protrusion 32 will be weak. The ratio of the pitch P to the diameter D of the heat transmission pipe, P/D, will therefore be set within the range of 0.5 to 1.25.

Preferably, the pitch P of the groove 31 should generally be the same as the refrigerant dispensation pitch of the dispenser 19, P1, that is, the pitch at which the dispensation holes are provided. The ratio of the pitch of the groove to the refrigerant dispensation pitch should be at least within the range of 0.5 to 1.25. This is because if the pitch P is too small when the refrigerant falls dropwise from the refrigerant dispensation holes, the refrigerant will not spread over the heat transmission pipe 30, and will instead fall directly into the groove 31. Conversely, if the pitch P is too large, the pipe will be rather smooth as if it had no groove 31 formed thereon. As a result, though the heat transmission pipe 30 will be easier to be wetted, the protrusion 32 corresponding to the groove 31 will be less in height, thereby reducing a liquid agitating effect caused by the turbulence generated within the heat transmission pipe 30. The pitch P according to the embodiment of the present invention, which has been adapted to satisfy all the requirements for the pitch P of the groove 31, is, for example, 14 mm. By thus predetermining the pitch, it was demonstrated by experiments that a heat transmission coefficient will improve as much as 20% or more as compared to that of a smooth pipe.

Figure 3:
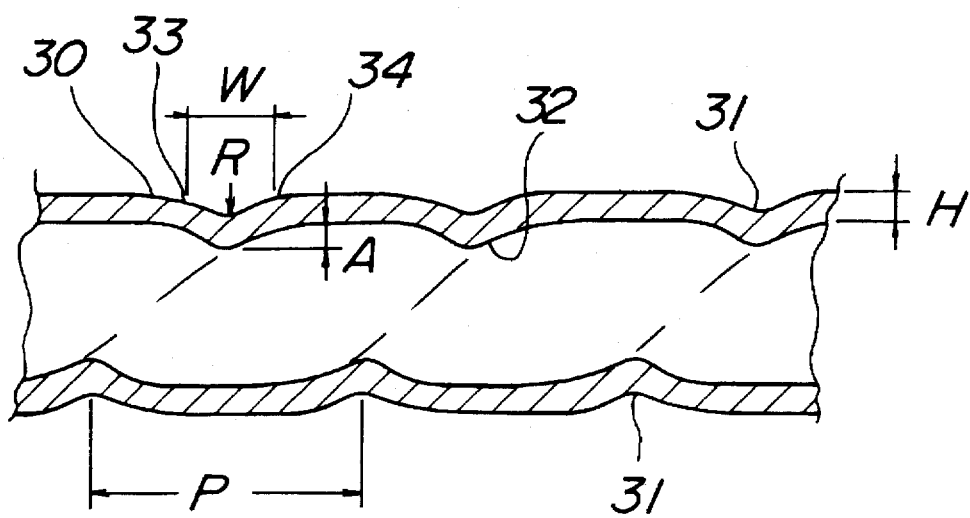
FIG. 3 is a sectional view of a heat transmission pipe.

As illustrated in FIG. 3, the depth H of the groove 31 is, for example, 0.4 mm. It should be set at least within the range of 0.3 mm to 0.7 mm. It is 0.7 mm or less in this embodiment because if the depth H is too large, the refrigerant dripped will penetrate into the groove 31 instead of spreading over the outer surface of the heat transmission pipe 30. By predetermining the depth to be rather small, therefore, the refrigerant will tend to spread off the groove. Also, it is 0.3 mm or more because if the depth is too small, the turbulent effect of a cooling water caused by the protrusion 32 corresponding to the groove 31 will decrease.

In addition, the width W of the groove 31 is, for example, 0.9 mm. The width W of the groove 31 herein refers to the width between an inflection point 33 where the curvature of the groove 31 begins and another inflection point 34 where the curvature of the groove of the groove 31 ends. If the width W is too large, the refrigerant dripped will gather at the groove 31. It should therefore be set within the range of 0.5 mm to 5.0 mm. The radius R of the groove should be set within the range of 0.5 mm to 1.0 mm. Not predetermining the R at too small a magnitude will prevent the refrigerant from penetrating into the groove in a hardly withdrawable manner.

The height, that is, a dimension of inward raise, of the protrusion 32 formed on the inner surface of each heat transmission pipe 30 should be set within the range of 0.3 mm to 0.6 mm. This is because if the height is too small, an improvement in the heat exchange efficiency caused by the liquid agitating effect may hardly be obtained, while if it is too large, flow resistance within the heat transmission pipe 30 will be greater, impairing the flow through the pipe.

Figure 4:
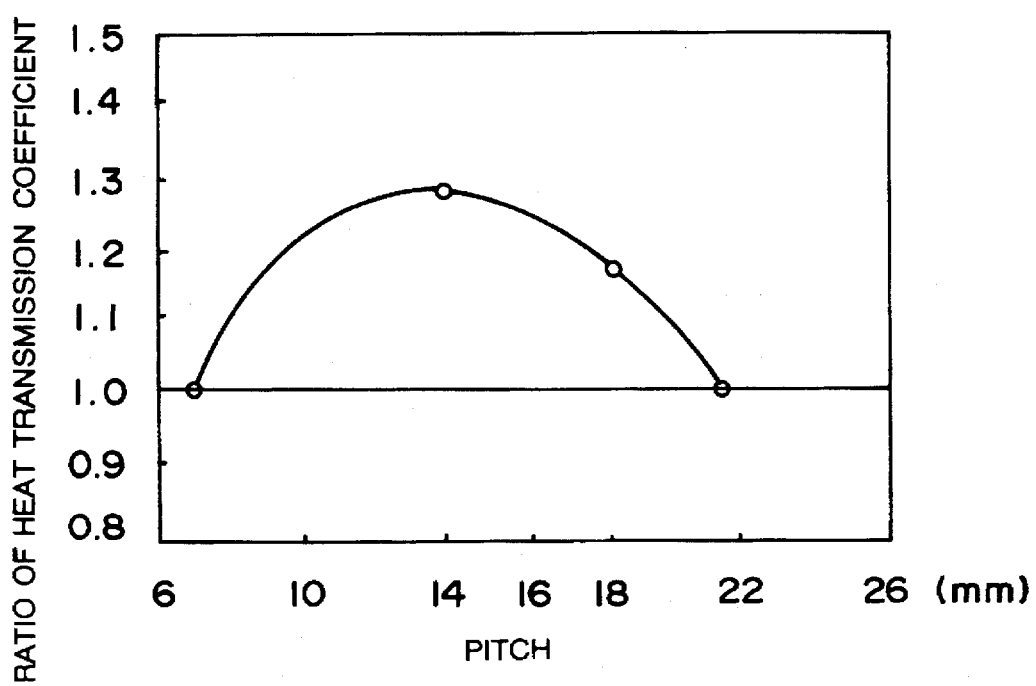
FIG. 4 is a graphical representation of the change of performance of a heat transmission pipe of an evaporator where the pitch of a groove is varied.

FIG. 4 graphically represents a ratio of heat transmission coefficient of the heat transmission pipe 30 against that of a smooth pipe where the outer diameter is 16 mm and the pitch of the groove 31 is varied in the heat transmission pipe 30. The depth H of the groove 31 is constantly 0.4 mm and the width of the groove 31 is constantly 0.9 mm. As will be apparent from the result shown in the FIG. 4, if the pitch P is varied from 8 mm to 20 mm, that is, the ratio of the pitch P to the diameter D is varied from 0.5 to 1.25, the heat transmission coefficient will be 1.1 times or more of that in the smooth pipe.

Figure 6:
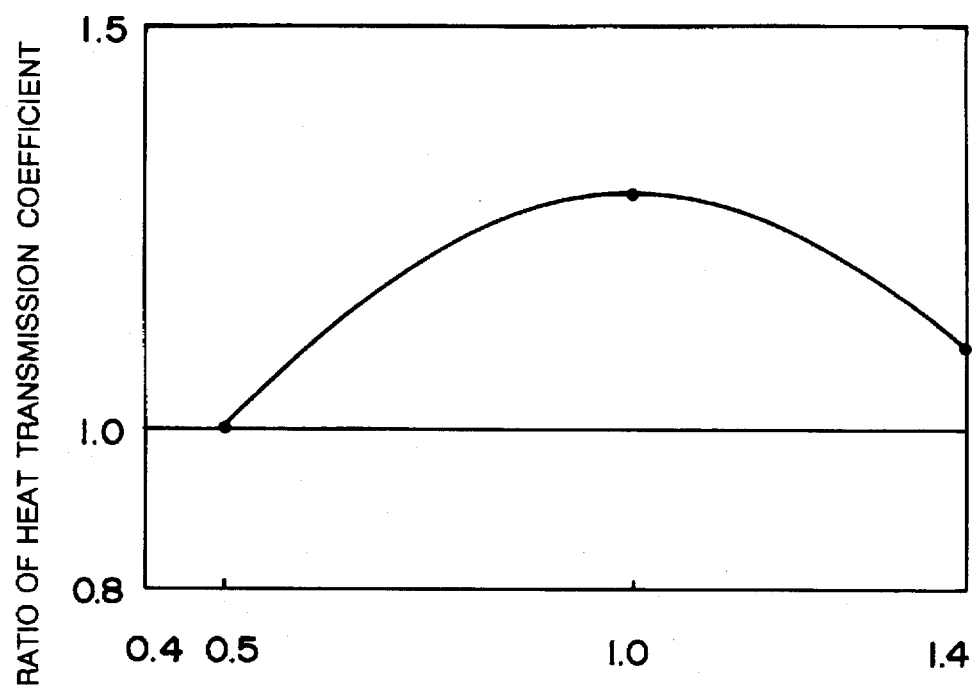
FIG. 6 is a graphical representation of the change of performance of a heat transmission pipe of an evaporator where the ratio of the pitch of a groove to the refrigerant dispensation pitch is varied.

FIG. 6 graphically represents the relationship between the ratio of the pitch P to the refrigerant dispensation pitch P1 and the ratio of the heat transmission coefficient. As shown, it has been found that the heat transmission coefficient will reach the peak where the pitch P of the groove 31 of the heat exchange pipe 30 is approximately the same as the refrigerant dispensation pitch P1. It has also been found that if the ratio of the groove pitch P to the refrigerant dispensation pitch P1 of a dispenser, that is, P/P1, is within the range of 0.6 to 1.4, the heat transmission coefficient will be greater than 1.05, thereby improving the performance of the heat transmission pipe (corrugated pipe) 30 of the evaporator. This is because, as mentioned previously, the pitch P is not too small, allowing the refrigerant to spread moderately over the heat transmission pipe 30 but is not too large either, providing a sufficient liquid agitating effect within the heat transmission pipe 30.

When the pitch P is 7 mm or smaller, that is, too small, the refrigerant will not sufficiently spread over the heat transmission pipe 30, thereby decreasing the heat transmission coefficient. Alternatively, when the pitch P is 21 mm or more, which is too large, a liquid agitating effect can not be obtained, with the heat transmission coefficient decreased.

Figure 5:
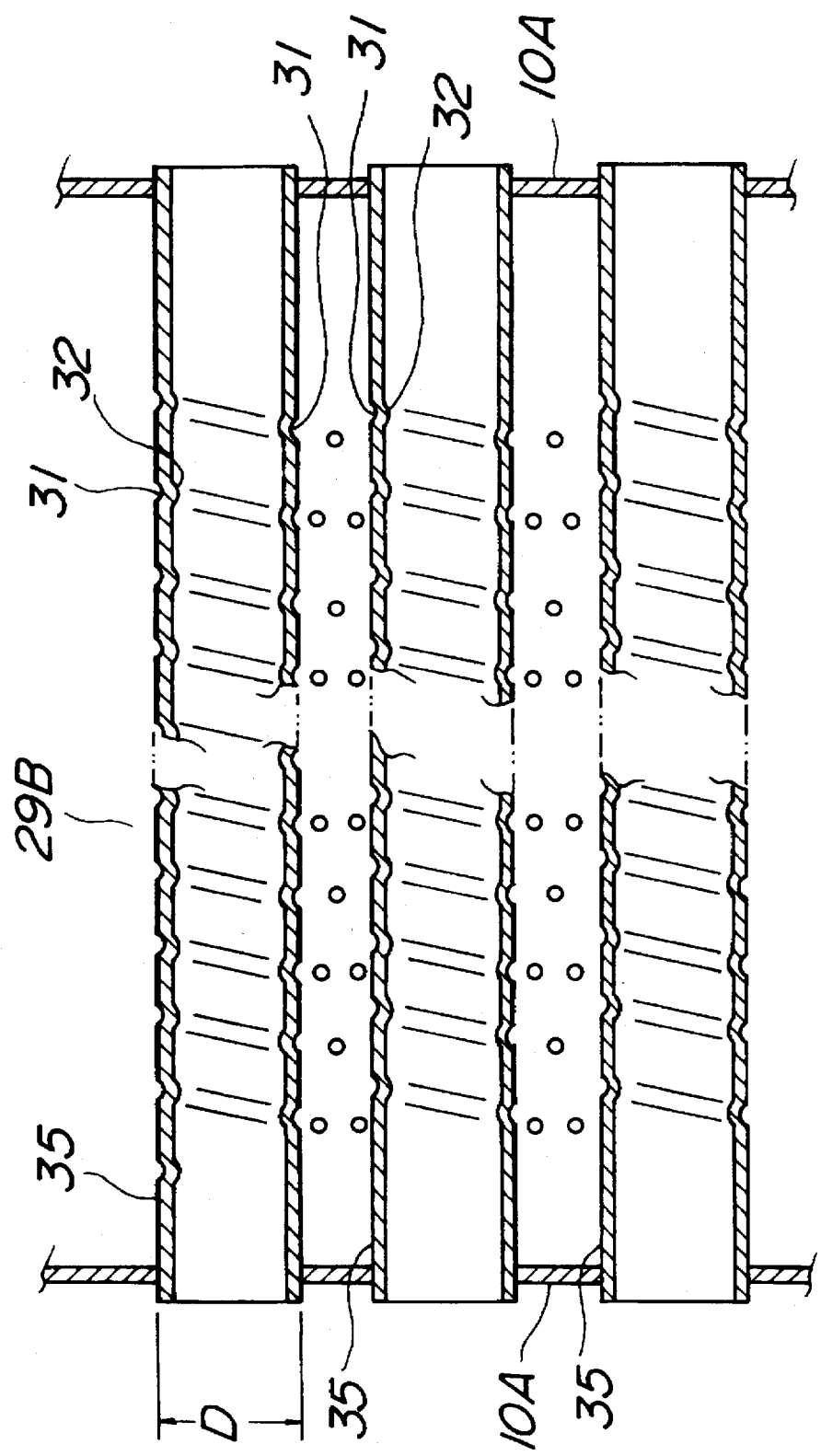
FIG. 5 is a side view illustrating the structure of a condenser.

The condenser heat exchanger 29B of the condenser 12 is, similarly to the evaporator heat exchanger 21A described above, composed of heat transmission pipes 35 which are provided in a plurality of columns and rows. As illustrated in FIG. 5, these heat transmission pipes 35 are corrugated pipes as are the evaporator heat transmission pipes 30 and are retained with the both ends by pipe plates 10A, 10A of the evaporator-regenerator shell 10. A spiral groove 31 is formed on the outer surface of each pipe. The groove 31 has also appropriate dimensions similarly to the case of the evaporator. Namely, the groove 31 has a width of 0.5 mm to 5 mm, a depth of 0.3 mm to 0.7 mm, and a radius of curvature of 0.5 mm to 5 mm. A protrusion 32 is also formed on the inner surface of each heat transmission pipe corresponding to the groove 31. Because poor wettability is preferable in order to promote the condensation of refrigerant vapor, no polishing should be made of the outer surface of the heat transmission pipe 35.

Figure 7:
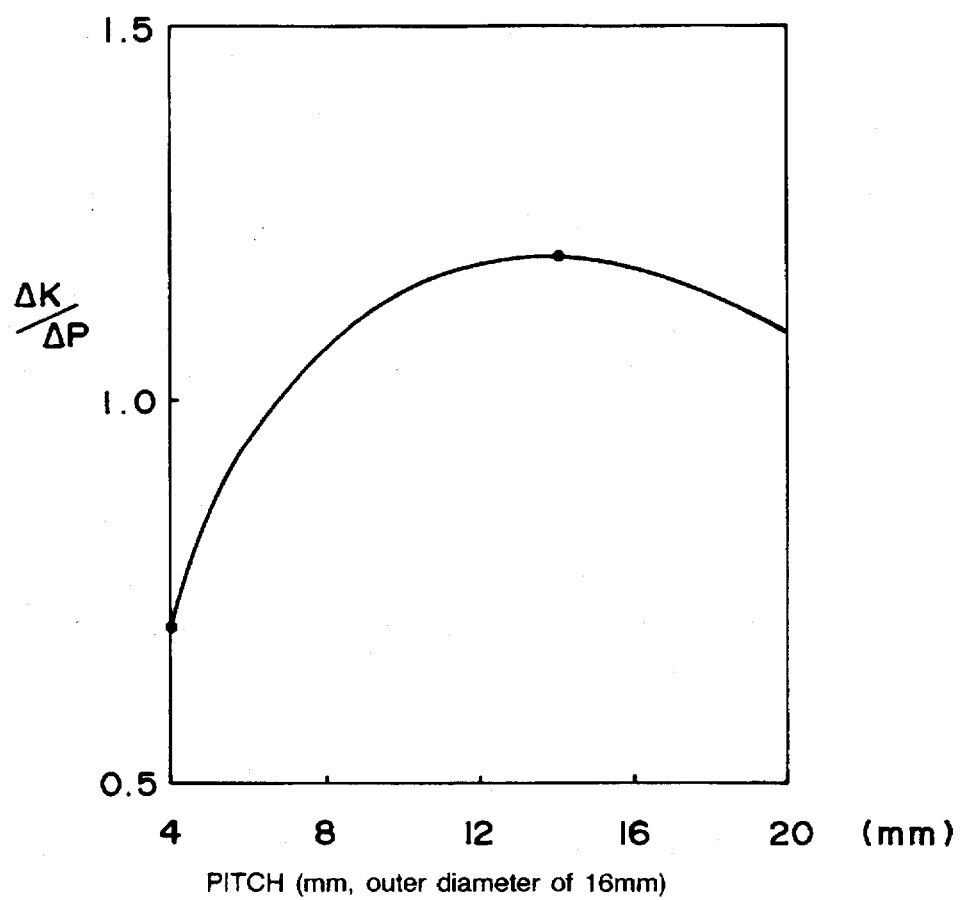
FIG. 7 is a graphical representation of the change of performance of a condenser where the pitch of a groove is varied.

FIG. 7 graphically represents the performance of a corrugated pipe composing a heat transmission pipe 35 of the condenser heat exchanger 29B. The abscissa axis of the illustration represents the spiral pitch of the corrugated pipe, that is, the pitch of a groove. The ordinate axis represents a ratio (K/(P, wherein (K represents a performance ratio of heat transmission coefficient of the corrugated pipe to that of a smooth pipe (bare pipe) and (P represents a ratio of pressure loss of the corrugated pipe to that of a smooth pipe. Namely, the ordinate axis represents the performance of the corrugate pipe using non-dimensional numbers, wherein more than 1 means a good performance and less that 1 means a poor performance. The corrugated pipe has an outer diameter of 16 mm. As can be seen from the illustration, when the pitch of the groove is 8 mm to 20 mm, the ratio (K/(P is greater than 1.05. It has therefore been found that this embodiment will be effective when the ratio of the groove pitch of the heat transmission pipe to the outer diameter dimension of the pipe is 0.5 to 1.25.

The absorber heat exchanger 19A of the absorber 3 is, similarly to the evaporator heat exchanger 21A described above, composed of heat transmission pipes 35 which are provided in a plurality of columns and rows. The arrangement is analogous to the one shown in FIG. 5, and, therefore, no particular illustration will be referred to. These heat transmission pipes 35 are corrugated pipes as are the evaporator heat transmission pipes 30 and are retained with the both ends by the pipe plates 10A, 10A of the evaporator-regenerator shell 10. A spiral groove 31 is formed on the outer surface of each pipe. The groove 31 also has appropriate dimensions similarly to the case of the evaporator. Namely, the groove 31 has a width of 0.5 mm to 5 mm, a depth of 0.3 mm to 0.7 mm, and a radius of curvature of 0.5 mm to 1 mm. A protrusion 32 is also formed on the inner surface of the heat transmission pipe corresponding to the groove 31.

The relationship between the pitch of the groove 31, that is, the spiral pitch and the heat transmission coefficient is similar to that illustrated in FIG. 4 in connection to the evaporator. Namely, if the ratio of the pitch P to the diameter D of the heat transmission pipe 35 is varied from 0.5 to 1.25, the heat transmission coefficient will be 1.1 times or more of that in a smooth pipe.

Figure 8:
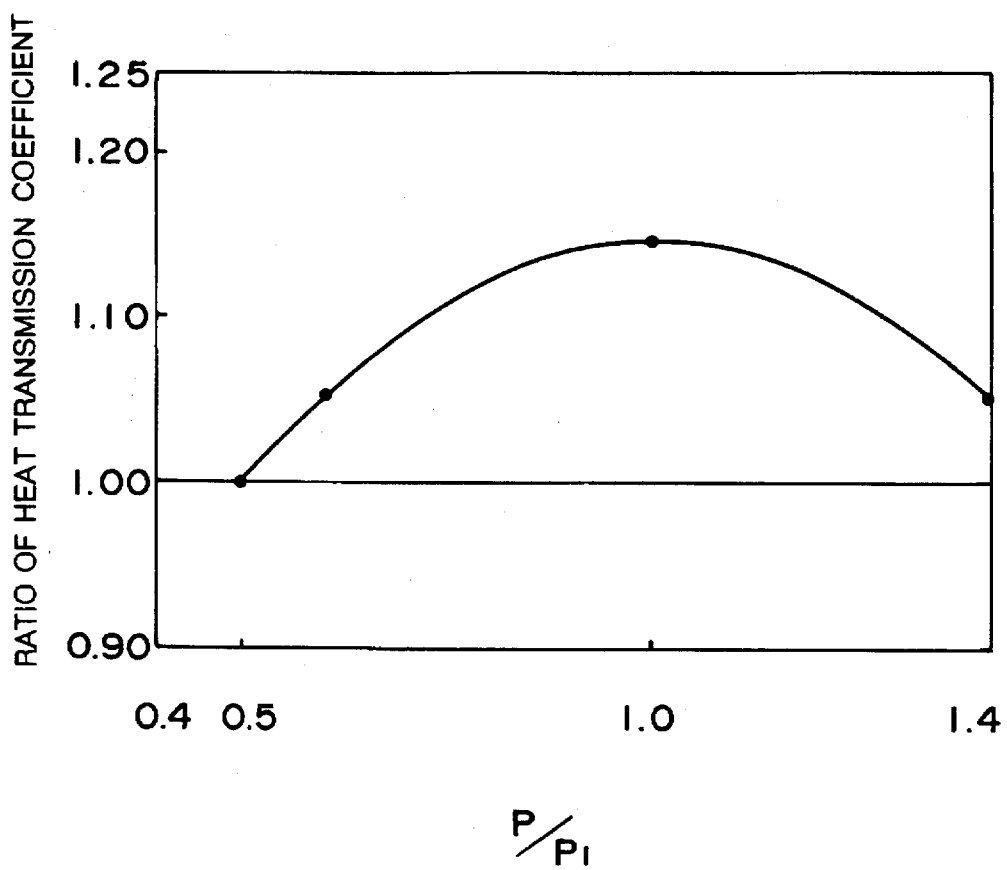
FIG. 8 is a graphical representation of the change of performance of a heat transmission pipe of an absorber where the ratio of the pitch of a groove to the absorbent dispensation pitch is varied.

FIG. 8 graphically represents the relationship between the ratio of the pitch P of the groove 31 to the refrigerant dispensation pitch P1 and the ratio of the heat transmission coefficient. As shown, it has been found that if the ratio P/P1 is in the range of 0.6 to 1.4 (which means the pitch P of the groove 31 is 8 mm to 20 mm), the ratio of the heat transmission coefficient will be greater than 1.05, thereby improving the performance of the heat transmission pipe 35 (corrugated pipe) of the absorber. It has also been found that the heat transmission coefficient will reach the peak where the pitch P of the groove 31 of the heat transmission pipe 30 is approximately the same as the refrigerant dispensation pitch P1.

In operation of an absorption type refrigerating machine as arranged above, a gas burner 4 of an high temperature regenerator 5 burns and heats a diluted absorbent, such as aqueous solution of lithium bromide, flowing in from an absorber 3 to separate a refrigerant vapor from the diluted absorbent. The refrigerant vapor will flow through a refrigerant vapor pipe 13 to a low temperature regenerator 11. The low temperature regenerator 11 heats an intermediate absorbent from the high temperature regenerator 4 to provide a condensed refrigerant liquid which flows to a condenser 12. The condenser 12 condenses the refrigerant vapor flowing in from the low temperature regenerator 11, and flows it down to the evaporator 2 together with a refrigerant liquid flowing in from the low temperature regenerator 11. Within the evaporator 2, the refrigerant liquid will be dispensed by the operation of an refrigerant pump 18 onto an evaporator heat exchanger 21A. A cooling water which has been cooled to a low temperature in the evaporator heat exchanger 21A is then supplied to a load. The refrigerant vapor generated in the evaporator 2 will flow to the absorber 3 to be absorbed by a concentrated absorbent dispensed onto an absorber heat exchanger 29A.

An intermediate absorbent having an elevated temperature in which a refrigerant vapor has been separated in the high temperature regenerator 4 will flow via an intermediate absorbent pipe 22, a high temperature heat exchanger 8, another intermediate absorbent pipe 23 and a second absorbent pump 24 to the low temperature regenerator 11, into which the intermediate absorbent from the high temperature regenerator 4 will flow, accelerated by the second absorbent pump 24. The intermediate absorbent will then be heated by a heater 14 to separate a refrigerant vapor therefrom, further increasing its temperature.

A concentrated absorbent which has been heated and condensed in the low temperature regenerator 11 will flow into a concentrated absorbent pipe 25 and pass through a low temperature heat exchanger 7 and a concentrated absorbent pipe 26 to the absorber 3. It will then be dispensed from a dispenser 27 onto the absorber heat exchanger 29A.

While the absorption type refrigerating machine is operating as described above, a refrigerant falls dropwise from a dispenser 19 of the evaporator 2 onto heat transmission pipes 30. The refrigerant will then spread and flow smoothly over the outer surface of each heat transmission pipe 30 and will fall dropwise onto other heat transmission pipes 30 in a generally uniform fashion, during which part of the refrigerant flows along a groove 31 and falls downward. In addition, a cooling water running in each heat transmission pipe 30 will have a turbulence generated by a protrusion 32 to improve the heat transfer between the cooling water and the heat transmission pipe 30. Further, the refrigerant will fall dropwise also onto lower heat transmission pipes 30 in the evaporator 2 from the upper heat transmission pipes 30 in a generally uniform fashion so that wetting of the surfaces of the heat transmission pipes 30 may be secured.

In operation of the heat exchanger 29B of the condenser 12, a refrigerant vapor flowing from the low temperature regenerator 11 will be condensed on the outer surface of each heat transmission pipe 35. The refrigerant will flow downward along the outer surface of the heat transmission pipe 35 to fall dropwise from the lower end onto other heat transmission pipes 35 below, where the refrigerant on the outer surface of each pipe will gather in a groove 31 to drip downward. Thus, on the outer surface of the heat transmission pipe 35, instead of spreading, the refrigerant will flow and fall dropwise along the groove 31, thereby increasing the condensing area. In addition, a cooling water running in the heat transmission pipe 35 will have a turbulence generated by a protrusion 32, improving the heat transfer efficiency between the cooling water and the heat transmission pipe 35.

In the heat exchanger 29A of the absorber 3, a concentrated absorbent to be dispensed is cooled by a cooling water running in each heat transmission pipe 30 to facilitate the absorption of refrigerant vapor. The concentrated absorbent dispensed will then fall dropwise onto heat transmission pipes 30. The absorbent will flow downward over the outer surface of each heat transmission pipe 30 and fall dropwise from the lower end onto other heat transmission pipes 30 located below, where the absorbent on the outer surface of each pipe will drip downward along a groove. Thus, on the outer surface of the heat transmission pipe 30, the absorbent falls dropwise along the groove 31, not spreading, which will facilitate to prevent the refrigerant vapor which has once been absorbed by the absorbent from vaporizing again. In addition, the cooling water running in the heat transmission pipe 30 will have a turbulence generated by a protrusion 32, improving the heat transfer efficiency between the cooling water and the heat transmission pipes 30.

According the embodiment described above, since each heat transmission pipe 30 of the evaporator 2 has a groove which is predetermined as described above with respect to the ratio of the pitch to the outer diameter D, the depth and the width, when a refrigerant falls dropwise onto the heat transmission pipes 30, the refrigerant on the outer surface of each pipe will spread generally over the whole surface of the pipe instead of intensively flowing along a groove 31, enabling an improvement of the heat transfer between the refrigerant and the heat transmission pipes 30 as well as allowing the refrigerant to fall dropwise in a generally uniform fashion onto heat transmission pipes 30 located below. In addition, a cooling water running in each heat transmission pipe 30 will have a turbulence generated by a protrusion 32, improving the heat transfer between the cooling water and the heat transmission pipe 30, so that the heat exchange efficiency in the heat transmission pipe may be considerably improved. As a result, the performance of the evaporator 2 can be significantly improved, which allows to reduce the number of the heat transmission pipes 30 so that the evaporator 2 and, hence, the evaporator-absorber shell 1 may be downsized.

Further, when the outer surface of the heat transmission pipe 30 is polished, wettability will further be improved, and the heat exchange efficiency in the heat transmission pipe 30 can additionally be increased.

In addition, since each heat transmission pipe 35 of the condenser 12 is a corrugated pipe having a spiral groove 31 and a protrusion 32, a refrigerant which has condensed on the outer surface of the pipe will gather in and flow along the groove 31, which allows to prevent the refrigerant from spreading over the whole outer surface of the pipe and to secure a condensing area, especially on the heat transmission pipes 35 at a lower stage to which the refrigerant will fall dropwise. It is advisable that the pitch of the groove 31 of the heat transmission pipe 35 be smaller than that of the heat transmission pipe 30 so that the refrigerant will flow downward along the groove 31 instead of spreading over the outer surface of the pipe. Also, the cooling water will have a turbulence generated by a protrusion 32 formed on the inner surface of the heat transmission pipe 35, improving the heat transfer between the cooling water and the heat transmission pipes 35, so that the heat exchange efficiency in the heat transmission pipe 35 may be considerably improved. As a result, the performance of the condenser 12 can be significantly improved, which allows to reduce the number of the heat transmission pipes 35 so that the condenser 12 and, hence, the condenser-regenerator shell 10 may be downsized. Thereby, the absorption type refrigerating machine can be significantly downsized. Downsizing the absorption type refrigerating machine will also enable to reduce the volume of absorbent to be filled.

Moreover, since the heat exchanger 29A provided below the dispenser 27 of the absorber 3 is composed of a plurality of heat transmission pipes 30, each of which is a corrugated pipe formed similarly to the heat transmission pipe 30 for the evaporator 2, having generally the same depth, pitch and width of the groove as that of the heat transmission pipe 30, when the absorption type refrigerating machine is operating, it can prevent a concentrated absorbent dripped from the dispenser 27 from intensively flowing along the groove, which therefore allows the concentrated absorbent to flow generally over the whole surface of the pipe, increasing the heat transfer between the concentrated absorbent and the heat transmission pipe 30. Further, it will also absorb the refrigerant vapor from the evaporator 2 by the concentrated absorbent spread over the whole surface, which improves the absorbing capacity, and further, will enable the concentrated absorbent to fall dropwise in a generally uniform fashion onto the heat transmission pipes 30 located below. In addition, a cooling water running in the heat transmission pipes 30 will have a turbulence generated by a protrusion 32, which improves the heat transfer between the cooling water and the heat transmission pipe 30, so that the heat transfer efficiency in the heat transmission pipe 30 may be considerably improved. As a result, the performance of the absorber 3 can be significantly improved, which allows to reduce the number of the heat transmission pipes 30 so that the absorber 3 may be downsized. Thereby, not only the evaporator 2 and the condenser 12 described above, but the absorption type refrigerating machine can also be considerably downsized.

As described above, according to the first, second, third and fourth embodiments of the present invention, part of a refrigerant will flow along a groove and the remainder will spread generally over the whole surface of each heat transmission pipe, improving the heat transfer efficiency between the refrigerant and the heat transmission pipe. Also, due to a turbulent effect caused by a protrusion in each heat transmission pipe, the heat transfer efficiency between a cooling water and the heat transmission pipe will be improved. In addition, by providing the pitch of the groove at a predetermined dimension to the outer dimension of the pipe and the refrigerant dispensation pitch, mutually contradictory effects of spreading the refrigerant over the outer surface of the heat transmission pipe and of achieving a sufficient turbulent effect in the heat transmission pipe may coexist. The thermal efficiency in the heat transmission pipe will thereby be significantly improved so that the enhancement of the evaporator performance may be attained.

According to the second embodiment of the present invention, the refrigerant will not only flow along each groove, but can as well sufficiently spread off the groove, therefore, further increasing the heat transfer efficiency.

According to the third embodiment of the present invention, by providing the height of the protrusion provided on the inner surface of each heat transmission pipe at a predetermined dimension, a sufficient turbulent effect may be obtained, which increases the heat transfer efficiency between the cooling water and the heat transmission pipe to a sufficient level, while preventing the increase of a flow loss against the cooling water in the heat transmission pipe as well as avoiding the enlargement of units such as pumps.

According to the fourth embodiment of the present invention, wettability of the outer surface of each heat transmission pipe against the refrigerant can be improved, so that the heat transfer efficiency to the refrigerant in the heat transmission pipe may be increased.

According to the fifth embodiment of the present invention, the refrigerant condensed on the outer surface of each heat transmission pipe of the condenser may be prevented from spreading over the whole outer surface of the pipe, which allows to avoid the re-vaporization of the refrigerant, improving the condensing capacity. Also, since the heat transfer efficiency of the heat transmission pipe to the refrigerant can be improved, the heat transfer efficiency in the heat transmission pipe will also be improved, so that a performance enhancement of the condenser may be attained.

According to the sixth embodiment of the present invention, the concentrated absorbent dripped onto each heat transmission pipe of the absorber will spread over the whole surface along the groove formed on the outer surface of the heat transmission pipe, improving the heat transfer efficiency between the concentrated absorbent and the heat transmission pipe. Also, due to the protrusion corresponding to the groove, the cooling water in the heat transmission pipe will have a turbulence generated, which improves the heat transfer efficiency between the cooling water and the heat transmission pipe. Therefore, the heat exchange efficiency of the heat transmission pipe may be improved so that a performance enhancement of the condenser may be attained.

What is claimed is:

1. An absorption type refrigerating machine comprising:

an evaporator which cools a cooling water by vaporization of a refrigerant to supply the cooling water to a load;

an absorber into which a refrigerant vapor from the evaporator flows and in which a concentrated absorbent is dispensed to absorb the refrigerant vapor by the concentrated absorbent;

a regenerator which heats a diluted absorbent from the absorber to separate a refrigerant vapor therefrom; and a condenser into which the refrigerant vapor from the regenerator flows and in which the refrigerant vapor is condensed, said elements all connected by piping to form a refrigerating cycle, said evaporator including:

a plurality of heat transmission pipes accommodated therein and arranged generally in a horizontal direction, each pipe having at least one continuity of protrusion on the inner surface thereof extending in the axial direction of the pipe in a spiral fashion and at least one continuity of groove corresponding to said continuity of protrusion formed on the outer surface of the pipe, the ratio of the pitch of the groove of the heat transmission pipe to the outer diameter dimension of the pipe being set within the range of 0.5 to 1.25; and a dispenser provided above the heat transmission pipes for dispensing the refrigerant, the ratio of the pitch of the groove of the heat transmission pipe to the refrigerant dispensation pitch of the dispenser being set within the range of 0.6 to 1.4.

2. An absorption type refrigerating machine according to claim 1, wherein the groove of each heat transmission pipe is 0.5 mm to 5 mm in width, 0.3 mm to 0.7 mm in depth and 0.5 mm to 1 mm in radius of curvature.

3. An absorption type refrigerating machine according to claim 1, wherein the protrusion on the inner surface of each heat transmission pipe is 0.3 mm to 0.6 mm in height.

4. An absorption type refrigerating machine according to claim 1, wherein the outer surface of each heat transmission pipe is buffed and finished.

5. An absorption type refrigerating machine comprising:

an evaporator which cools a cooling water by vaporization of a refrigerant to supply the cooling water to a load;

an absorber into which a refrigerant vapor from the evaporator flows and in which a concentrated absorbent is dispensed to absorb the refrigerant vapor by the concentrated absorbent;

a regenerator which heats a diluted absorbent from the absorber to separate a refrigerant vapor therefrom; and a condenser into which the refrigerant vapor from the regenerator flows and in which the refrigerant vapor is condensed, said elements all connected by piping to form a refrigerating cycle, said condenser including:

a plurality of heat transmission pipes accommodated therein and arranged generally in a horizontal direction in which the cooling water flows, each pipe having at least one continuity of protrusion on the inner surface thereof extending in the axial direction of the pipe in a spiral fashion and at least one continuity of groove corresponding to said continuity of protrusion formed on the outer surface of the pipe, the groove of the heat transmission pipe being 0.5 mm to 5 mm in width, 0.3 mm to 0.7 mm in depth and 0.5 mm to 1 mm in radius of curvature and the ratio of the pitch of the groove of the heat transmission pipe to the outer diameter dimension of the pipe being set within the range of 0.5 to 1.25.

6. An absorption type refrigerating machine comprising:

an evaporator which cools a cooling water by vaporization of a refrigerant to supply the cooling water to a load;

an absorber into which a refrigerant vapor from the evaporator flows and in which a concentrated absorbent is dispensed to absorb the refrigerant vapor by the concentrated absorbent;

a regenerator which heats a diluted absorbent from the absorber to separate a refrigerant vapor therefrom; and a condenser into which the refrigerant vapor from the regenerator flows and in which the refrigerant vapor is condensed, said elements all connected by piping to form a refrigerating cycle, said absorber including:

a plurality of heat transmission pipes accommodated therein and arranged generally in a horizontal direction in which the cooling water flows, each pipe having at least one continuity of protrusion on the inner surface thereof extending in the axial direction of the pipe in a spiral fashion and at least one continuity of groove corresponding to said continuity of protrusion formed on the outer surface of the pipe; and a dispenser provided above the heat transmission pipes for dispensing the concentrated absorbent, the groove of the heat transmission pipe being 0.5 mm to 5 mm in width, 0.3 mm to 0.7 mm in depth and 0.5 mm to 1 mm in radius of curvature, the ratio of the pitch of the groove of the heat transmission pipe to the outer diameter dimension of the pipe being set within the range of 0.5 to 1.25, and the ratio of the pitch of the groove of the heat transmission pipe to the absorbent dispensation pitch of the dispenser being set within the range of 0.6 to 1.4.

7. An absorption type refrigerating machine according to claim 2, wherein the protrusion on the inner surface of each heat transmission pipe is 0.3 mm to 0.6 mm in height.

8. An absorption type refrigerating machine according to claim 7, wherein the outer surface of each heat transmission pipe is buffed and finished.

* * * * *